(12) United States Patent
Akao et al.

(10) Patent No.: US 12,096,802 B2
(45) Date of Patent: Sep. 24, 2024

(54) FLAVOR GENERATION DEVICE WITH TEMPERATURE SENSOR

(71) Applicant: Japan Tobacco Inc., Tokyo (JP)

(72) Inventors: Takeshi Akao, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 900 days.

(21) Appl. No.: 17/105,224

(22) Filed: Nov. 25, 2020

(65) Prior Publication Data

US 2021/0076744 A1    Mar. 18, 2021

Related U.S. Application Data

(63) Continuation of application No. PCT/JP2018/021047, filed on May 31, 2018.

(51) Int. Cl.
| | |
|---|---|
| *A24F 40/53* | (2020.01) |
| *A24F 40/48* | (2020.01) |
| *A24F 40/51* | (2020.01) |
| *A24F 40/60* | (2020.01) |
| *H01M 10/0525* | (2010.01) |
| *H01M 10/42* | (2006.01) |
| *H01M 10/48* | (2006.01) |
| *A24F 40/10* | (2020.01) |

(52) U.S. Cl.
CPC .............. *A24F 40/53* (2020.01); *A24F 40/48* (2020.01); *A24F 40/51* (2020.01); *A24F 40/60* (2020.01); *H01M 10/0525* (2013.01); *H01M 10/4257* (2013.01); *H01M 10/486* (2013.01); *A24F 40/10* (2020.01); *H01M 2010/4271* (2013.01); *H01M 2220/30* (2013.01)

(58) Field of Classification Search
CPC ........... A24F 40/53; A24F 40/48; A24F 40/51
See application file for complete search history.

(56) References Cited

U.S. PATENT DOCUMENTS

| | | | |
|---|---|---|---|
| 6,150,971 A | 11/2000 | Naylor et al. | |
| 9,462,832 B2 * | 10/2016 | Lord | A24F 40/60 |
| 9,888,725 B2 * | 2/2018 | Cameron | H04L 67/04 |
| 9,949,507 B2 * | 4/2018 | Flick | A24F 40/50 |
| 10,021,910 B2 | 7/2018 | Gavrielov et al. | |
| 10,575,560 B2 * | 3/2020 | Tucker | H05B 3/42 |

(Continued)

FOREIGN PATENT DOCUMENTS

| | | |
|---|---|---|
| GB | 2507102 A | 10/2012 |
| GB | 2528711 A | 2/2016 |

(Continued)

OTHER PUBLICATIONS

Japanese Office Action for Japanese Appilcation No. 2020-086038, dated Aug. 14, 2020, with English translation.

(Continued)

*Primary Examiner* — Hae Moon Hyeon
(74) *Attorney, Agent, or Firm* — XSENSUS LLP

(57) ABSTRACT

A flavor generation device comprising: a power supply; a flow path for passing an air flow generated as a result of inhalation by a user, and a temperature sensor which outputs a detected value or estimated value of the temperature of the power supply. The temperature sensor is located in a position other than a position in which the air flow provides the highest cooling effect.

12 Claims, 9 Drawing Sheets

(56) References Cited

U.S. PATENT DOCUMENTS

| | | | |
|---|---|---|---|
| 2014/0299141 A1* | 10/2014 | Flick | H05B 1/0202 219/494 |
| 2015/0237917 A1* | 8/2015 | Lord | G01L 19/04 131/328 |
| 2015/0359263 A1 | 12/2015 | Bellinger | |
| 2016/0053988 A1 | 2/2016 | Quintana | |
| 2017/0095001 A1 | 4/2017 | Liu | |
| 2017/0119052 A1* | 5/2017 | Williams | H05B 3/44 |
| 2017/0207499 A1 | 7/2017 | Leadley | |
| 2017/0360099 A1 | 12/2017 | Duc | |
| 2018/0289075 A1 | 10/2018 | Gavrielov et al. | |
| 2019/0183183 A1 | 6/2019 | Ito | |
| 2019/0187002 A1 | 6/2019 | Baba | |
| 2020/0245695 A1* | 8/2020 | Fornarelli | H05B 3/46 |
| 2021/0015158 A1* | 1/2021 | Moloney | A24F 40/60 |

FOREIGN PATENT DOCUMENTS

| | | |
|---|---|---|
| JP | 2003-98147 A | 4/2003 |
| JP | 2015-536648 A | 12/2015 |
| JP | 2017-79747 A | 5/2017 |
| JP | 6150971 B1 | 6/2017 |
| JP | 2017-518733 A | 7/2017 |
| WO | WO 87/01453 A1 | 3/1987 |
| WO | WO 2015/069914 A1 | 5/2015 |
| WO | WO 2015/165813 A1 | 11/2015 |
| WO | WO 2015/192084 A1 | 12/2015 |
| WO | WO 2016/015264 A1 | 2/2016 |
| WO | WO 2017/072705 A2 | 5/2017 |
| WO | WO 2017/081299 A1 | 5/2017 |
| WO | WO 2017/220273 A1 | 12/2017 |
| WO | WO 2018/001746 A1 | 1/2018 |
| WO | WO 2018/003497 A1 | 1/2018 |
| WO | WO 2018/037562 A1 | 3/2018 |
| WO | WO 2018/146787 A1 | 8/2018 |
| WO | WO 2019/229957 A1 | 12/2019 |

OTHER PUBLICATIONS

Japanese Office Action for Japanese Application No. 2020-086039, dated Aug. 14, 2020, with English translation.
Japanese Office Action for Japanese Application No. 2020-086040, dated Aug. 14, 2020, with English translation.
Japanese Office Action for Japanese Application No. 2020-086040, dated Nov. 27, 2020, with English translation.
Japanese Office Action for Japanese Application No. 2020-086040, dated Oct. 2, 2020, with English translation.
European Office Action for European Application No. 21173841.4, dated Sep. 9, 2021.
Chinese Office Action and Search Report for Chinese Application No. 201880093716.7, dated Mar. 30, 2023, with an English translation.
European Search Report for European Application No. 21173840.6, dated Aug. 30, 2021.
European Search Report for European Application No. 21173841.4, dated Aug. 27, 2021.
Russian Office Action and Search Report for Russian Application No. 2020142074, dated Mar. 16, 2021, with English translation.
Extended European Search Report for European Application No. 18920938.0, dated Dec. 10, 2021.
International Search Report for PCT/JP2018/021047 (PCT/ISA/210) mailed on Aug. 7, 2018.

* cited by examiner

FLAVOR GENERATION DEVICE WITH TEMPERATURE SENSOR

CROSS REFERENCE TO RELATED APPLICATION

This application is a Continuation of PCT International Application No. PCT/JP2018/021047, filed on May 31, 2018, which is hereby expressly incorporated by reference into the present application.

BACKGROUND OF THE INVENTION

Field of the Invention

The present invention relates to a flavor generation device.

Description of the Related Art

In place of a cigarette, an aerosol generation device or a flavor generation device, which causes a user to taste an aerosol generated by atomizing an aerosol source by a load such as a heater, is known (PTL 1 and PTL 2). The aerosol generation device or the flavor generation device includes a heating element that atomizes an aerosol source, a power supply that supplies power to the heating element, and a control unit that controls the load and the power supply.

Each of the aerosol generation device and the flavor generation device described in PTL 1 and PTL 2 includes a temperature sensor configured to measure the ambient temperature of the device in use. PTL 1 discloses adjusting the heating temperature of the heating element based on the read value of the ambient temperature by the temperature sensor and making the device unusable if the ambient temperature measured by the temperature sensor exceeds a limit threshold. PTL 2 discloses inhibiting charge of the power supply by a charger if the ambient temperature read by the temperature sensor exceeds a predetermined temperature.

CITATION LIST

Patent Literature

PTL 1: Japanese Patent Laid-Open No. 2017-079747
PTL 2: Japanese Patent Laid-Open No. 2017-518733

SUMMARY OF INVENTION

A first feature is specified by a flavor generation device comprising: a power supply: a channel configured to pass an airflow generated by inhalation by a user; and a temperature sensor configured to output one of a detection value and an estimation value of a temperature of the power supply, wherein the temperature sensor is arranged at a position other than a position where a cooling effect of the airflow is highest.

A second feature is specified as that in the flavor generation device specified as the first feature, the temperature sensor is arranged outside the channel and inside the flavor generation device.

A third feature is specified as that the flavor generation device specified as the first or second feature further comprises: an inlet configured to take outside air into the channel; and a mouthpiece used to inhale a flavor, wherein the temperature sensor is arranged far from the inlet when viewed from the mouthpiece.

A fourth feature is specified as that in the flavor generation device specified as any one of the first to third feature, the temperature sensor is arranged in a region that is open to atmosphere at least during inhalation by the user.

A fifth feature is specified as that the flavor generation device specified as any one of the first to fourth features further comprises a mouthpiece used to inhale a flavor, wherein the temperature sensor is arranged far from the power supply when viewed from the mouthpiece.

A sixth feature is specified as that the flavor generation device specified as the fifth feature further comprises: an inlet configured to take outside air into the channel, wherein the power supply is arranged far from the inlet when viewed from the mouthpiece.

A seventh feature is specified as that the flavor generation device specified as any one of the first to sixth features comprises a housing structure configured to house the temperature sensor is included inside the flavor generation device.

A eighth feature is specified as that the flavor generation device specified as any one of first to seventh features further comprises a first member configured to at least partially envelop the temperature sensor, and a second member arranged between the temperature sensor and the power supply, wherein a heat conductivity of the second member is higher than a heat conductivity of the first member.

A ninth feature is specified as that in the flavor generation device specified as any one of the first to eighth features, when a surface along a direction of a longest vector in vectors of the airflow generated by inhalation by the user or a direction of a longest vector in vectors of a secondary airflow generated by a negative pressure generated by inhalation by the user is defined as a first surface, the temperature sensor is arranged such that a main surface of an electronic component including the temperature sensor tilts with respect to the first surface.

A tenth feature is specified as that in the flavor generation device specified as the ninth feature, when a surface orthogonal to the first surface is defined as a second surface, the temperature sensor is arranged such that an angle between the main surface of the electronic component including the temperature sensor and the second surface becomes smaller than an angle between the main surface and the first surface.

A eleventh feature is specified as that in the flavor generation device specified as the tenth feature, the main surface of the electronic component including the temperature sensor is orthogonal to the first surface.

A twelfth feature is specified as that in the flavor generation device specified as any one of the first to eleventh features, the power supply includes at least one of an electrolytic liquid and an ionic liquid, and the flavor generation device comprises a control device configured to execute protection control of protecting the power supply if an output value of the temperature sensor is not more than a first predetermined temperature at which the electrolytic liquid or the ionic liquid solidifies, or if the temperature of the power supply is estimated, based on the output value of the temperature sensor, to be not more than the first predetermined temperature.

A thirteenth feature is specified as that in the flavor generation device specified as nay one of the first to twelfth feature, the power supply is a lithium ion secondary battery, and the flavor generation device comprises a control device configured to execute protection control of protecting the power supply if the output value of the temperature sensor is not more than a second predetermined temperature at which electrodeposition occurs in an electrode of the power supply, or if the temperature of the power supply is estimated, based on the output value of the temperature sensor, to be not more than the second predetermined temperature.

A fourteenth feature is specified as that the flavor generation device specified as the first to thirteen feature further comprising a control device configured to execute protection control of protecting the power supply if the output value of the temperature sensor is not less than a third predetermined temperature at which a structure or a composition of the electrode of the power supply changes, or if the temperature of the power supply is estimated, based on the output value of the temperature sensor, to be not less than the third predetermined temperature.

A fifteenth feature is specified as that the flavor generation device specified as any one of the first to fourteenth features further comprising a control device configured to execute protection control of protecting the power supply if the output value of the temperature sensor is less than 0° C. or not less than 60° C., or if the temperature of the power supply is estimated, based on the output value of the temperature sensor, to be less than 0° C. or not less than 60° C.

A sixteenth feature is specified as that in the flavor generation device as specified as any one of the twelfth to fifteenth features, the protection control includes at least one of suppression of at least one of charge and discharge of the power supply and transmission of a warning signal.

DESCRIPTION OF THE EMBODIMENTS

Figure 1:
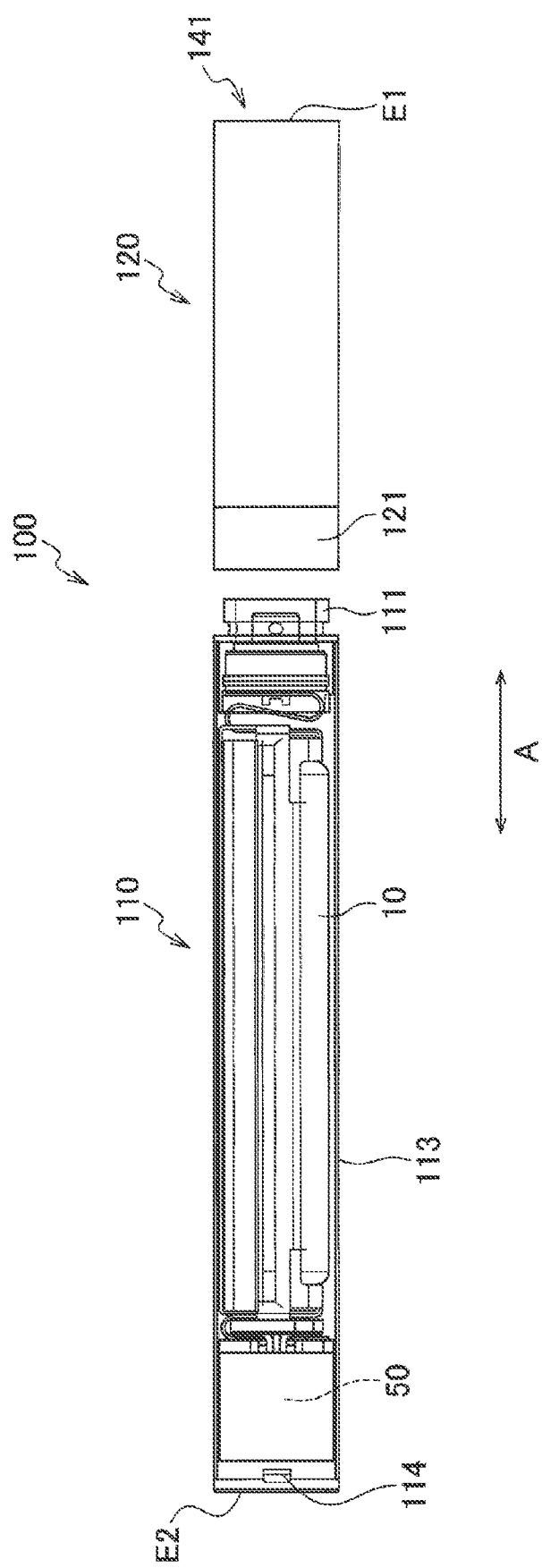
FIG. 1 is an exploded view showing a flavor generation device according to an embodiment.

An embodiment will be described below. Note that in the following description of drawings, the same or similar reference numerals denote the same or similar parts. It should be noted that the drawings are merely schematic, and the ratios of dimensions and the like may be different from the actuality.

Hence, detailed dimensions and the like should be judged in consideration of the following explanation. In addition, the drawings may include portions whose dimensional relationships or ratios are different, as a matter of course.

[Outline of Disclosure]

Inside a flavor generation device such as an electronic cigarette, a channel to pass a fluid such as a flavor (including an aerosol) exists. A temperature sensor may cool due to the influence of an airflow in the channel. If the temperature sensor cools due to the influence of the airflow, the accuracy of the detection value or estimation value of the temperature of a power supply may lower.

According to an aspect, a flavor generation device includes a power supply, a channel configured to pass an airflow generated by inhalation by a user, and a temperature sensor configured to output one of a detection value and an estimation value of a temperature of the power supply, wherein the temperature sensor is arranged at a position other than a position where a cooling effect of the airflow is highest.

According to the aspect, since the temperature sensor is hardly affected by the airflow, it is possible to suppress lowering of the accuracy of the detection value or the estimation value of the temperature of the power supply.

Embodiment (Flavor Generation Device)

Figure 2:
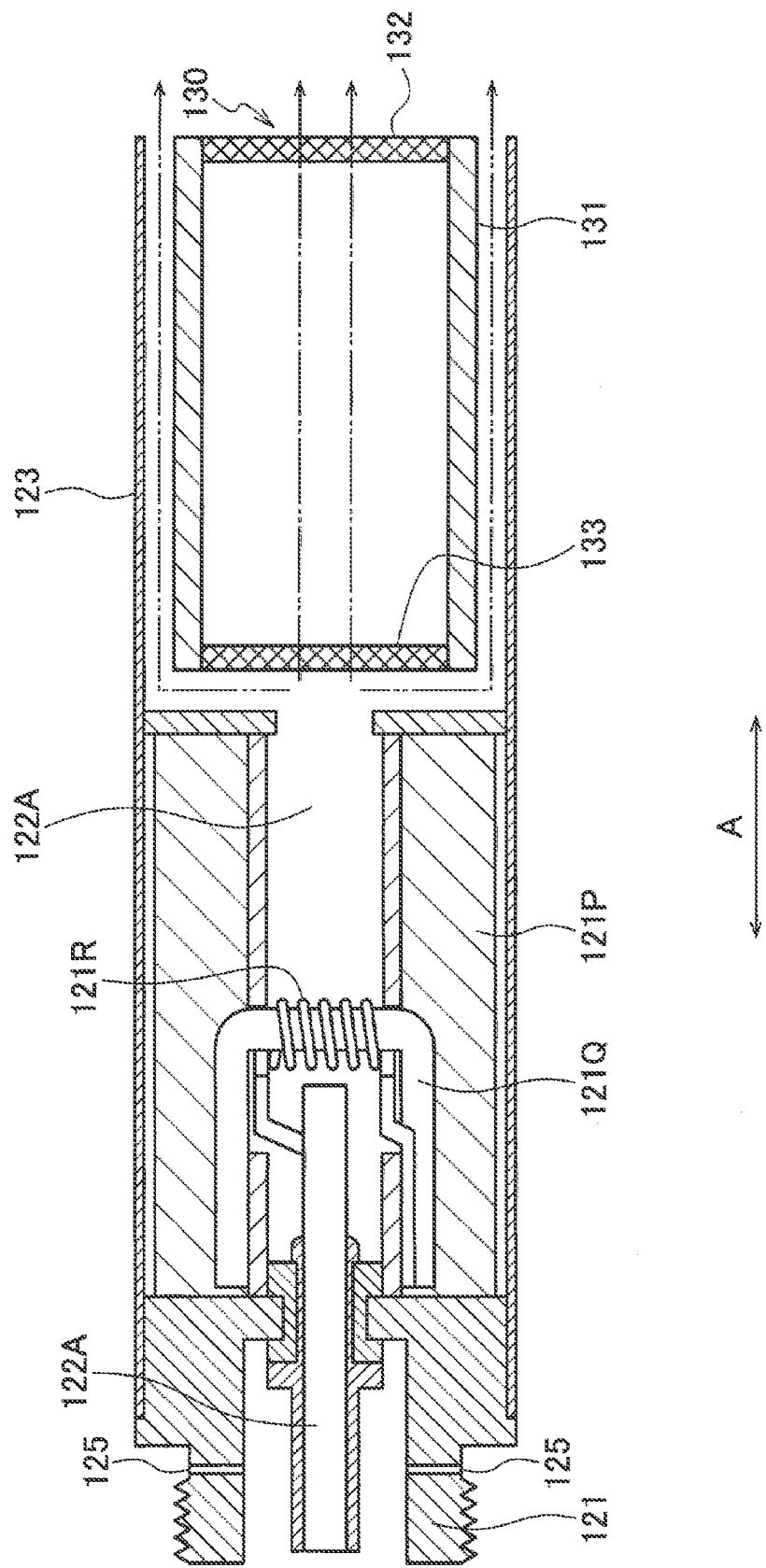
FIG. 2 is a view showing an atomizer according to an embodiment.
Figure 3:
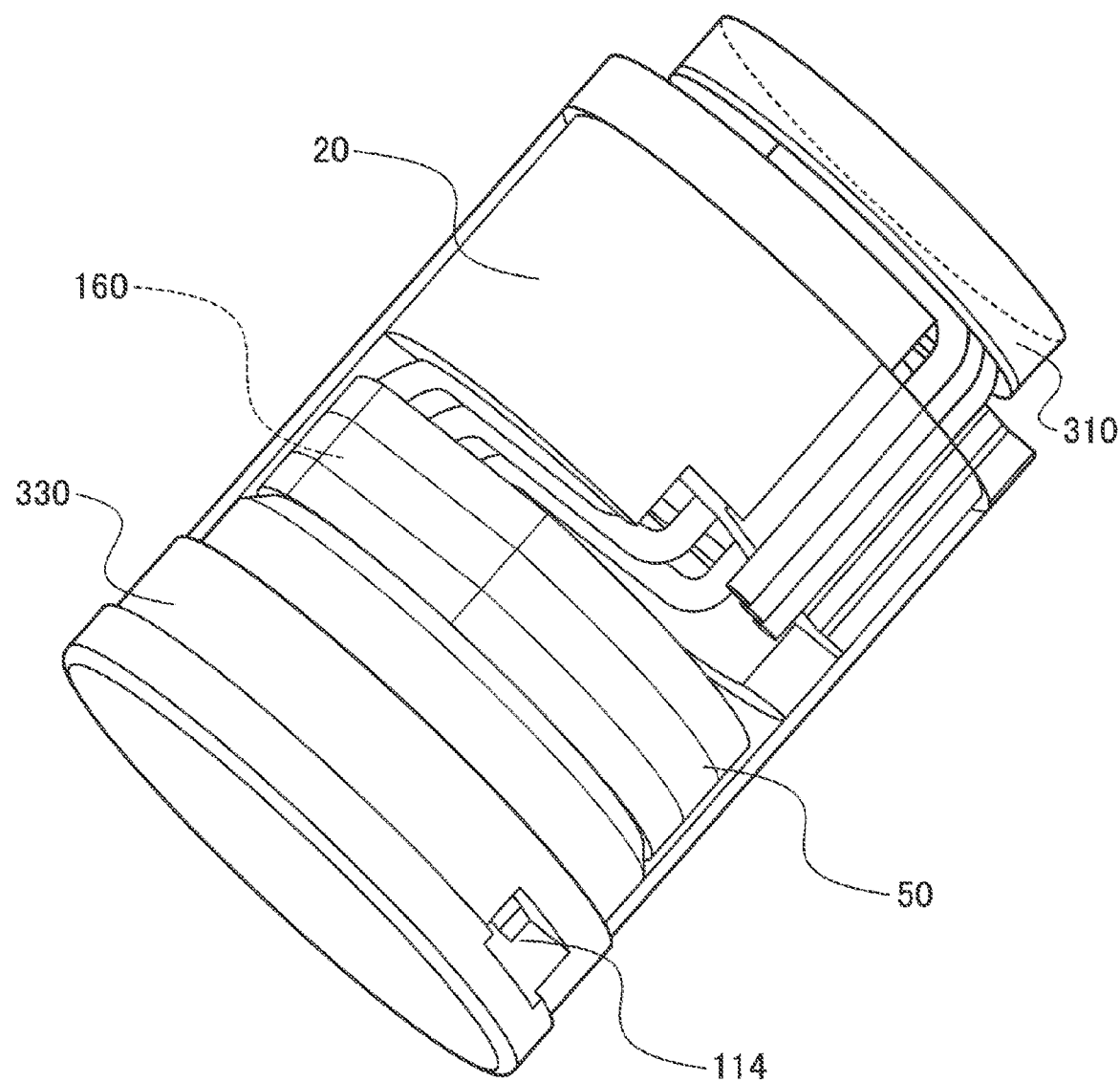
FIG. 3 is an enlarged perspective view of a part of a power supply.
Figure 4:
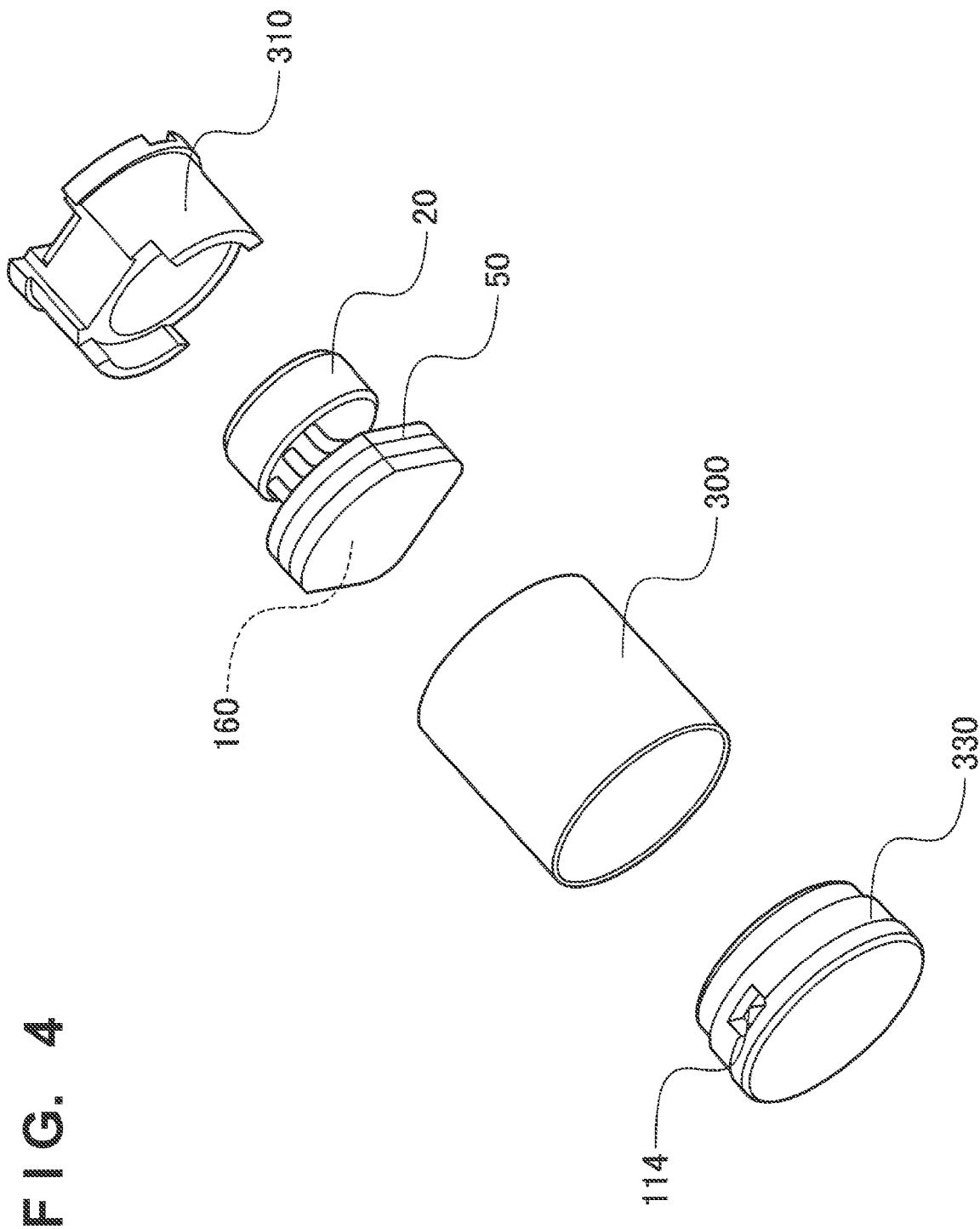
FIG. 4 is an exploded perspective view showing a disassembled part of the power supply.
Figure 5:
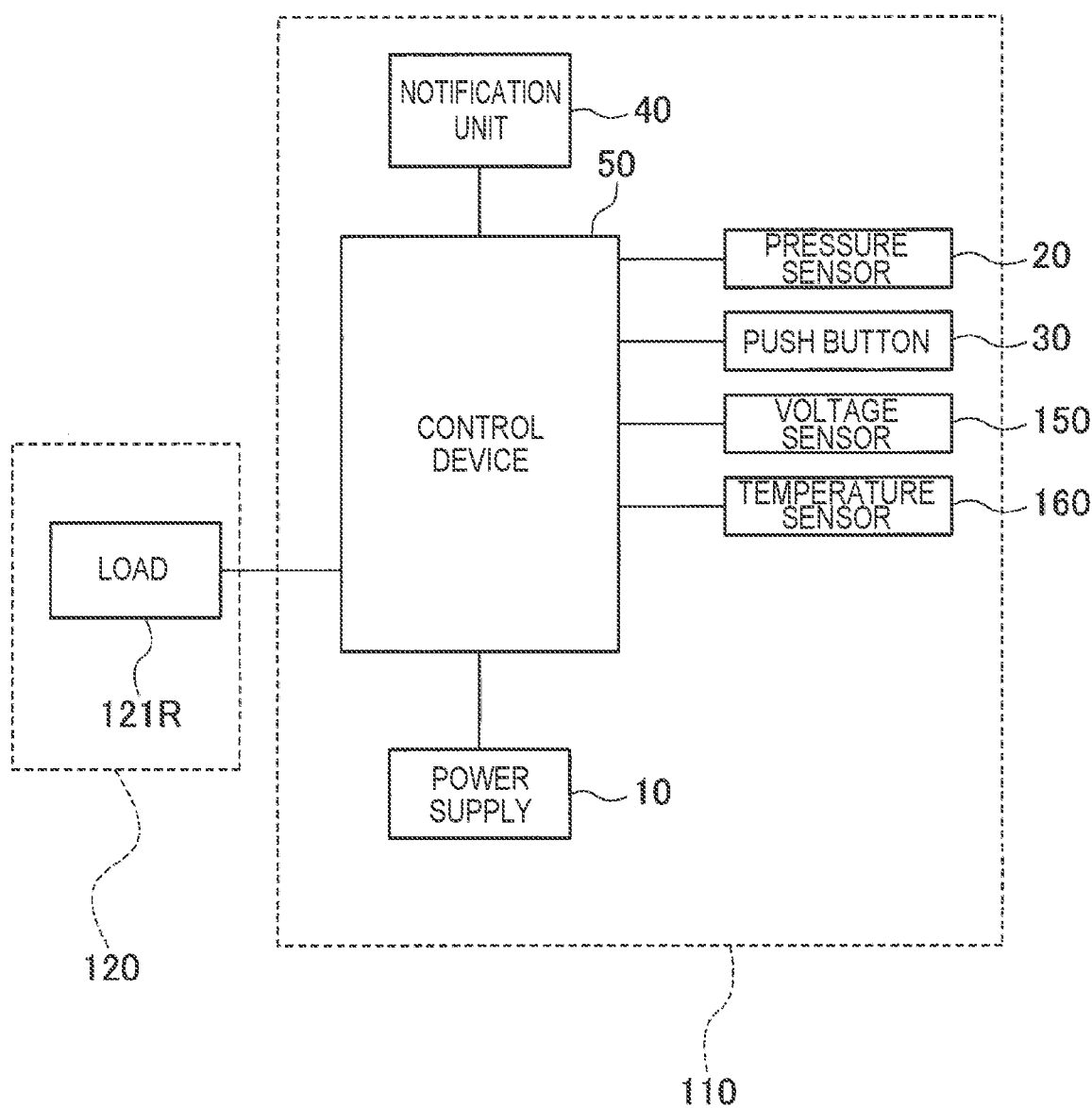
FIG. 5 is a block diagram of the flavor generation device.
Figure 6:
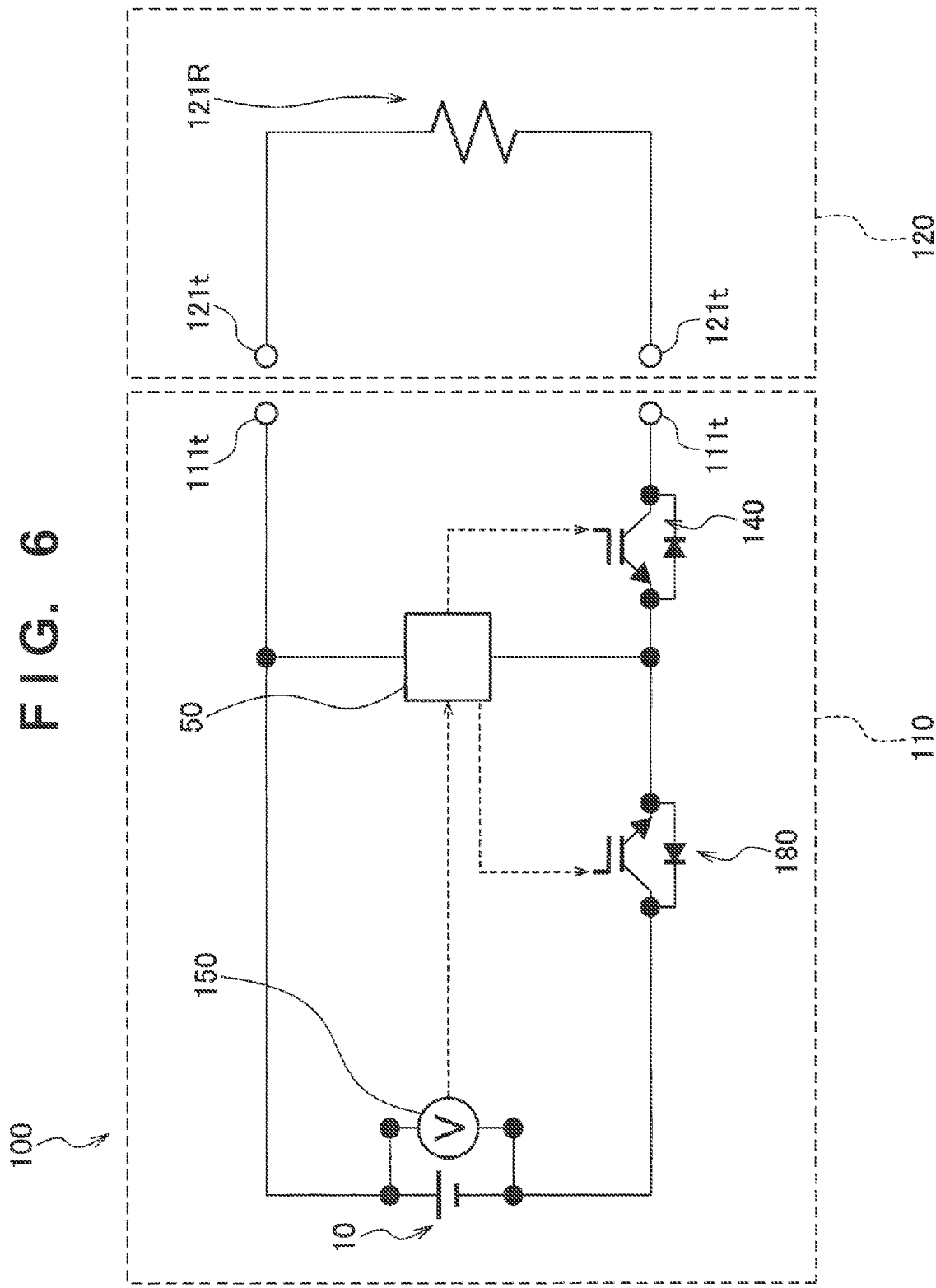
FIG. 6 is a view showing the electric circuits of the atomizer and the battery unit in a state in which a load is connected.
Figure 7:
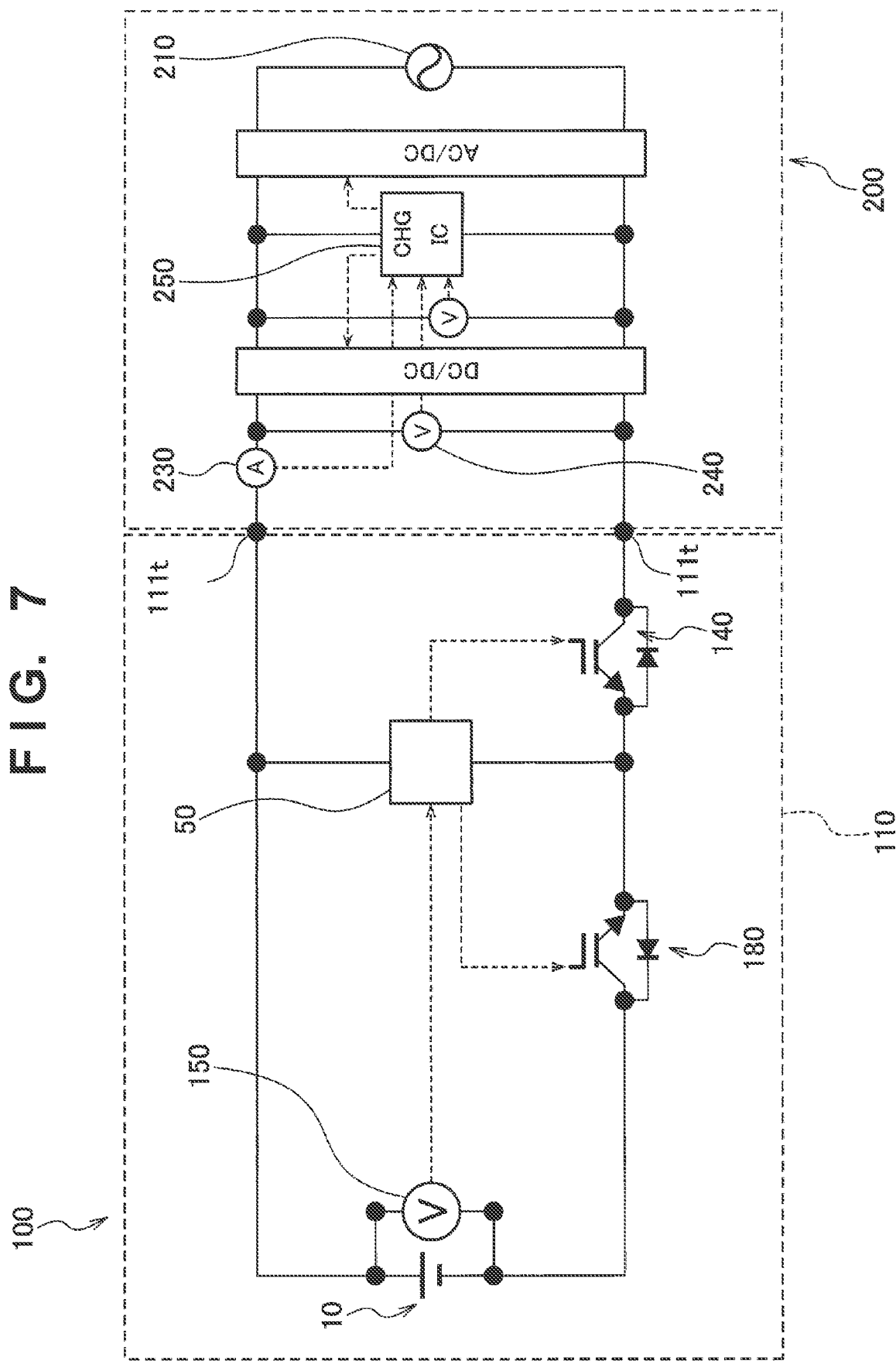
FIG. 7 is a view showing the electric circuits of a charger and the battery unit in a state in which the charger is connected.

A flavor generation device according to an embodiment will be described below. FIG. 1 is an exploded view showing a flavor generation device according to an embodiment. FIG. 2 is a view showing an atomizer according to an embodiment. FIG. 3 is an enlarged perspective view of a part of a power supply. FIG. 4 is an exploded perspective view showing a disassembled part of the power supply. FIG. 5 is a block diagram of the flavor generation device. FIG. 6 is a view showing the electric circuits of the atomizer and the battery unit in a state in which a load is connected. FIG. 7 is a view showing the electric circuits of a charger and the battery unit in a state in which the charger is connected.

A flavor generation device 100 may be a non-combustion type flavor inhalation device used to inhale a flavor without combustion. The flavor generation device 100 may have a shape extending along a predetermined direction A that is the direction from a non-mouthpiece end E2 to a mouthpiece end E1. In this case, the flavor generation device 100 may include one end portion E1 with a mouthpiece 141 used to inhale a flavor, and the other end portion E2 on the opposite side of the mouthpiece 141.

The flavor generation device 100 may include a power supply 110 and an atomizer 120. The atomizer 120 may include a case 123, and a load 121R arranged inside the case 123. The case 123 may form a part of the outer surface on the outermost side of the flavor generation device.

The atomizer 120 may be configured to be attachable/detachable to/from the power supply 110 via mechanical connecting portions 111 and 121. When the atomizer 120 and the power supply 110 are mechanically connected to each other, the load 121R in the atomizer 120 is electrically connected to a power source 10 provided in the power supply 110 via electrical connection terminals 111*t* and 121*t*. That is, the electrical connection terminals 111*t* and 121*t* form a connecting portion capable of electrically connecting the load 121R and the power supply 10.

The atomizer 120 includes an aerosol source to be inhaled by a user, and the electrical load 121R that atomizes the aerosol source by power from the power supply 10.

The load 121R need only be an element capable of generating an aerosol from the aerosol source using power from the power supply. For example, the load 121R may be a heating element such as a heater, or an element such as an ultrasonic generator. As the heating element, a heating resistor, a ceramic heater, an induction heating type heater, or the like can be used.

A more detailed example of the atomizer 120 will be described below with reference to FIGS. 1 and 2. The atomizer 120 may include a reservoir 121P, a wick 121Q, and the load 121R. The reservoir 121P may be configured to store a liquid aerosol source. The reservoir 121P may be a porous body formed by, for example, a material such as a resin web. The wick 121Q may be a liquid holding member that takes in the aerosol source from the reservoir 121P using a capillary phenomenon. The wick 121Q can be formed by, for example, glass fiber or porous ceramic.

The load 121R heats the aerosol source held by the wick 121Q. The load 121R is formed by, for example, a heating resistor (for example, a heating wire) wound around the wick 121Q.

Air that has flowed from an inlet 125 configured to take outside air into the channel passes, in a channel 122A, near the load 121R in the atomizer 120. An aerosol generated by the load 121R flows toward the mouthpiece 141 together with the air. The channel 122A means a passage between the inlet 125 and the mouthpiece 141 in a passage capable of flowing a fluid. That is, the channel 122A passes an airflow generated by inhalation by the user. In this embodiment, the channel 122A extends from the connecting portion between the atomizer 120 and the power supply 110 to the mouthpiece 141 via the atomizer 120.

In this embodiment, a form in which the inlet 125 is provided in the connecting portion 121 of the atomizer 120 has been described. In place of this embodiment, the inlet 125 may be provided in the connecting portion 111 of the power supply 110. Alternatively, in place of this embodiment, the inlet 125 may be provided in the connecting portion 121 of the atomizer 120 and the connecting portion 111 of power supply 110. In any form, the inlet 125 is provided in the connecting portion between the atomizer 120 and the power supply 110.

The aerosol source may be a liquid at room temperature. For example, a polyhydric alcohol can be used as the aerosol source. The aerosol source may contain a tobacco raw material that emits a tobacco flavor component when heated, or an extract derived from a tobacco raw material.

Note that in the embodiment, an example of an aerosol source that is a liquid at room temperature has been described in detail. Alternatively, an aerosol source that is a solid at room temperature can also be used. In this case, to generate an aerosol from the solid aerosol source, the load 121R may be in contact with or in close proximity to the solid aerosol source.

The atomizer 120 may include a flavor unit (cartridge) 130 configured to be exchangeable. The flavor unit 130 may include a tubular body 131 that houses a flavor source. The tubular body 131 may include a membrane member 133 and a filter 132, which can pass air or an aerosol. The flavor source may be provided in a space formed by the membrane member 133 and the filter 132.

According to an example of a preferred embodiment, the flavor source in the flavor unit 130 adds a tobacco flavor component to the aerosol generated by the load 121R of the atomizer 120. The flavor added to the aerosol by the flavor source is carried to the mouthpiece 141 of the flavor generation device 100.

The flavor source in the flavor unit 130 may be a solid at room temperature. As an example, the flavor source is formed by a raw material piece of a plant material that adds a tobacco flavor component to an aerosol. As the raw material piece that forms the flavor source, a formed body obtained by forming a tobacco material such as cut tobacco or a tobacco raw material into a granular shape can be used. Alternatively, the flavor source may be a formed body obtained by forming a tobacco material into a sheet shape. The raw material piece that forms the flavor source may be formed by a plant (for example, mint, herb, or the like) other than tobacco. A fragrance such as menthol may be added to the flavor source.

The flavor generation device 100 may include a mouthpiece with an inhalation port used by the user to inhale an inhalation component. The mouthpiece may be configured to be detachable from the atomizer 120 or the flavor unit 130, or may be configured to be inseparably integrated.

A more detailed example of the power supply 110 will be described below with reference to FIGS. 1, 3, and 4. The power supply 110 may include a case 113, a first electronic component arranged inside the case 113, and a second electronic component arranged inside the case 113. The case 113 may form a part of the outer surface on the outermost side of the flavor generation device.

The power supply 110 may include the power supply 10, a pressure sensor 20, a notification unit 40, a control device 50, and a temperature sensor 160. In this case, the above-described first electronic component may be, for example, the control device 50 or the pressure sensor 20. The second electronic component may be, for example, the power supply 10.

The power source 10 stores power necessary for the operation of the flavor generation device 100. The power source 10 may be detachable from the power supply 110. The power source 10 may be, for example, a rechargeable battery such as a lithium ion secondary battery.

The secondary battery may include a positive electrode, a negative electrode, a separator that separates the positive electrode and the negative electrode, and an electrolytic liquid or an ionic liquid. The electrolytic liquid or ionic liquid may be, for example, a solution containing an electrolyte. In a lithium ion secondary battery, the positive electrode is made of, for example, a positive electrode material such as a lithium oxide, and the negative electrode is made of, for example, a negative electrode material such as graphite. The electrolytic liquid may be, for example, a lithium salt organic solvent.

The pressure sensor 20 is configured to output the value of a pressure change in the flavor generation device 10, which is caused by inhalation or blowing by the user via the mouthpiece 141. More specifically, the pressure sensor 20 may be a sensor that outputs an output value (for example, a voltage value or a current value) according to an atmospheric pressure that changes in accordance with the flow rate of air inhaled from the non-mouthpiece side to the mouthpiece side (that is, a puffing operation of the user). The output value of the pressure sensor may have the dimension of a pressure, or may have the flow rate or flow velocity of inhaled air in place of the dimension of a pressure. Examples of such a pressure sensor are a condenser microphone sensor and a known flow rate sensor.

The notification unit 40 outputs a notification to notify the user of various kinds of information. The notification unit 40 may be, for example, a light-emitting element such as a light emitting diode (LED). Alternatively, the notification unit 40 may be an acoustic element that generates a sound, or a vibrator that generates a vibration. Also, the notification unit 40 may be formed by an arbitrary combination of a light-emitting element, an acoustic element, and a vibrator.

The notification unit 40 may be provided in an arbitrary portion of the flavor generation device 100. In this embodiment, the notification unit 40 is provided in the control device 50. If the notification unit 40 is a light-emitting element, a cap 330 may be transparent. Hence, light emitted by the notification unit 40 irradiates the outside via the cap 330. In place of this embodiment, the notification unit 40 may be provided anywhere if it can cause the user to recognize the notification.

The control device 50 performs various kinds of control of the flavor generation device 10. For example, the control device 50 may control power to be supplied to the load 121R. The flavor generation device 100 may include a switch 140 capable of electrically connecting and disconnecting the load 121R and the power source 10 (see FIG. 6). The switch 140 is opened/closed by the control device 50. The switch 140 may be formed by, for example, a metal-oxide-semiconductor field-effect transistor (MOSFET).

When the switch 140 is turned on, power is supplied from the power source 10 to the load 121R. On the other hand, when the switch 140 is turned off, supply of power from the power source 10 to the load 121R is stopped. The switch 140 is on/off-controlled by the control device 50.

The power supply 110 may include a request sensor capable of outputting an operation request signal that is a signal requesting the operation of the load 121R. The request sensor may be, for example, a push button to be pushed by the user, or the above-described pressure sensor 20. The control device 50 acquires the operation request signal to the load 121R and generates an instruction to operate the load 121R. In a detailed example, the control device 50 outputs, to the switch 140, an instruction to operate the load 121R, and the switch 140 is turned on in accordance with the instruction. Hence, the control device 50 may be configured to control power feed from the power source 10 to the load 121R. When power is supplied from the power source 10 to the load 121R, the aerosol source is vaporized or atomized by the load 121R.

Additionally, the power supply 110 may include a voltage sensor 150 capable of acquiring or estimating the output voltage of the power supply 10. In this case, the control device 50 can perform predetermined control in accordance with the output value of the voltage sensor 150. For example, the control device 50 can detect or estimate the remaining level of the power source 10 or an abnormality of the power source 10 based on the output value from the voltage sensor 150. Upon detecting lowering of the remaining level of the power source 10 or an abnormality of the power supply 10, the control device 50 may output a notification to the user under the control of the notification unit 40.

The power supply 110 may be configured to be connectable to a charger 200 that charges the power source 10 (see FIG. 7). When the charger 200 is connected to the power supply 110, the charger 200 is electrically connected to the power source 10 of the power supply 110. A pair of electrical terminals of the power supply 110 configured to electrically connect the charger 200 may be the same as the pair of electrical terminals 111t of the power supply 110 configured to electrically connect the load 121R. Alternatively, a pair of electrical terminals of the power supply 110 configured to electrically connect the charger 200 may be provided independently of the pair of electrical terminals 111t.

The control device 50 may include a determination unit configured to determine whether the charger 200 is connected. The determination unit may be a means for determining the presence/absence of connection of the charger 200 based on, for example, a change in the potential difference between the pair of electrical terminals to which the charger 200 is connected. The determination unit is not limited to this means, and may be any means if it can determine the presence/absence of connection of the charger 200.

For the purpose of simplifying the structure of the flavor generation device 100, a processor 250 of the charger 200 may be configured to be incommunicable with the control device 50 of the power supply 110. That is, a communication terminal used for communication between the processor 250 of the charger 200 and the control device 50 is unnecessary. In other words, in the connection interface to the charger 200, the power supply 110 may include only two electrical terminals for a main positive bus and a main negative bus.

In addition, the flavor generation device 100 may include a stop unit 180 that cuts or reduces the charge current to the power source 10 as needed. The stop unit 180 may be formed by, for example, a MOSFET switch. The control device 50 turns off the stop unit 180, thereby forcibly cutting or reducing the charge current to the power source 10 even if the power supply 110 is connected to the charger 200. Note that even if the dedicated stop unit 180 is not provided, the control device 50 may forcibly cut or reduce the charge current to the power source 10 by turning off the switch 140.

If an external power supply 210 is an AC power supply, the charger 200 may include an inverter (AC/DC converter) that converts an alternating current (AC) into a direct current (DC). The charger 200 may include the processor 250 that controls charge of the power supply 10. Also, the charger 200 may include an ammeter 230 and a voltmeter 240 as needed. The ammeter 230 acquires a charge current to be supplied from the charger 200 to the power supply 10. The voltmeter 240 acquires the voltage across the pair of electrical terminals to which the charger 200 is connected. In other words, the voltmeter 240 acquires the output voltage of the power supply 10. The processor 250 of the charger 200 controls charge of the power source 10 using the output value from the ammeter 230 and/or the voltmeter 240. If the power source 10 is a lithium ion secondary battery, the processor 250 may control charge of the power source 10 by known CC-CV (constant current-constant voltage) charge. Note that the charger 200 may further include a voltage sensor that acquires a DC voltage output from an inverter or a converter capable of boosting and/or lowering a DC voltage output from an inverter.

The control device 50 may include a determination means for determining whether the charger 200 is connected to the electrical terminals 111t. The determination means determines the presence/absence of connection of the charger 200 based on, for example, a change in the potential difference between the pair of electrical terminals 111t or the potential of at least one of the pair of electrical terminals 111t.

(Temperature Sensor)

The temperature sensor 160 provided in the power supply 110 is arranged inside or near the above-described first electronic component. The temperature sensor 160 can acquire the temperature of the first electronic component. The temperature sensor 160 may be provided inside the case 113.

If the first electronic component is the control device 50, the temperature sensor 160 is preferably provided in the control device 50 serving as the first electronic component from the viewpoint of space saving. Note that in the example shown in FIG. 4, the temperature sensor 160 is provided inside the control device 50. In this case, the control device 50 can be formed by, for example, a microcomputer incorporating the temperature sensor 160. Alternatively, the temperature sensor 160 may be provided on the case surface of the control device 50 or near the control device 50 without being incorporated in the control device 50. If the first electronic component is the pressure sensor 20, the temperature sensor 160 may be provided inside or near the pressure sensor 20.

The power source 10 (second electronic component) is arranged apart from the temperature sensor 160 by a distance longer than the distance between the temperature sensor 160 and the first electronic component. That is, the distance between the power source 10 and the temperature sensor 160 is preferably longer than the distance between the temperature sensor 160 and the first electronic component (the control device 50 or the pressure sensor 20). Note that if the temperature sensor 160 is incorporated in the control device 50, the distance between the temperature sensor 160 and the control device 50 is 0.

The control device 50 is configured to detect or estimate the temperature of the power source 10 serving as the second electronic component based on the output value of the temperature sensor 160. The control device 50 may detect the output value of the temperature sensor 160 itself as the temperature of the power supply 10. The control device 50 may correct the output value of the temperature sensor 160 in consideration of a loss or delay of heat conduction from the power source 10 and estimate the corrected value as the temperature of the power supply 10. As an example of correction of the output value of the temperature sensor 160, a value obtained by adding a predetermined value to the output value of the temperature sensor 160, a value obtained by multiplying the output value of the temperature sensor 160 by a predetermined coefficient, or the like may be estimated as the temperature of the power supply 10. Here, the above-described predetermined value and predetermined coefficient concerning correction can be decided by measuring the deviation between the output value of the temperature sensor 160 and the actual temperature of the power source 10 in advance by experiments. Note that the temperature sensor 160 may perform correction in place of the control device 50, and the control device 50 may estimate the temperature of the power source 10 based on the output value corrected by the temperature sensor 160.

That is, the temperature sensor 160 outputs the detection value or the estimation value of the temperature of the power supply 10. Hence, the temperature of the power source 10 is detected or estimated by the temperature sensor 160 arranged inside or near the first electronic component. Hence, since a dedicated temperature sensor that detects the temperature of the power source 10 need not be provided inside or near the power supply 10, an increase in the weight, volume, and cost of the flavor generation device 100 can be avoided. In addition, by the temperature sensor 160, the control device 50 can detect or estimate both the temperature of the first electronic component and the temperature of the power source 10 that is the second electronic component.

The temperature sensor 160 is arranged at a position other than a position where the cooling effect of an airflow generated by inhalation by the user is highest. In this case, since the temperature sensor 160 is hardly affected by the airflow, it is possible to suppress lowering of the accuracy of the detection value or the estimation value of the temperature of the power supply 10.

The temperature sensor 160 is preferably arranged far from the inlet 125 when viewed from the mouthpiece 141. Since outside air from the inlet 125 flows to the mouthpiece 141, the flow of the fluid is normally strong between the inlet 125 and the mouthpiece 141. Hence, when the temperature sensor 160 is arranged far from the inlet 125 when viewed from the mouthpiece 141, the temperature sensor 160 is hardly affected by the cooling effect of the airflow. Hence, the temperature sensor 160 can accurately detect or estimate the temperature of the power supply 10.

The temperature sensor 160 is preferably arranged outside the channel 122A in which a gas flows and inside the flavor generation device 100, that is, inside the case 113. In this case as well, since the temperature sensor 160 is hardly affected by the cooling effect of the airflow, the temperature sensor 160 can more accurately detect or estimate the temperature of the power supply 10. Also, the temperature sensor 160 is hardly affected by the ambient temperature because it is isolated from the periphery of the flavor generation device 100 by the case 113.

In this embodiment, the power source 10 is arranged far from the inlet 125 when viewed from the mouthpiece 141 (see FIG. 1). Also, the temperature sensor 160 is preferably arranged far from the power source 10 when viewed from the mouthpiece 141. In this case, the power source 10 is arranged between the temperature sensor 160 and the channel 122A from the inlet 125 to the mouthpiece 141. Hence, the power source 10 functions as a windshield, and exposure of the temperature sensor 16 to the airflow is suppressed. Hence, the temperature sensor 160 is hardly affected by the cooling effect of the airflow.

The temperature sensor 160 is preferably arranged in a region that is open to atmosphere at least during inhalation by the user. In this embodiment, an opening 114 open to atmosphere is formed in the cap 330. The temperature sensor 160 is hardly affected by the air cooling effect of an airflow generated by a negative pressure because it is open to atmosphere. Hence, the temperature sensor 160 can more accurately detect or estimate the temperature of the power supply 10.

The temperature sensor 160 is preferably arranged such that the main surface of the electronic component including the temperature sensor 160 tilts with respect to a first surface. Here, the "first surface" is defined by a surface along the direction of the longest vector in the vectors of the airflow generated by inhalation by the user or the direction of the longest vector in the vectors of a secondary airflow generated by a negative pressure generated by inhalation by the user. In addition, the main surface of the electronic component is defined by the widest surface of the electronic component. If the temperature sensor 160 is incorporated in the control device 50, the above-described main surface of the electronic component corresponds to the main surface of the control device 50. As shown in FIG. 4, if the control device 50 has a partially columnar shape, the main surface of the control device 50 may be defined by a surface corresponding to the bottom surface of the column.

In this embodiment, the channel 122A extends long along the predetermined direction A. Hence, the direction of the longest vector in the vectors of the airflow generated by inhalation by the user or the direction of the longest vector in the vectors of the secondary airflow generated by the negative pressure generated by inhalation by the user substantially matches the predetermined direction A. In this case, the above-described "first surface" is defined by a surface along the predetermined direction A. At this time, the temperature sensor 160 is preferably arranged such that the main surface of the electronic component including the temperature sensor 160 tilts with respect to the surface along the predetermined direction A.

More preferably, the temperature sensor 160 is arranged such that the angle between the main surface of the electronic component including the temperature sensor 160 and a second surface orthogonal to the first surface becomes smaller than the angle between the main surface and the above-described first surface. Here, if the "first surface" is defined by the surface along the predetermined direction A, the "second surface" is defined by a direction orthogonal to the predetermined direction A.

More preferably, the temperature sensor 160 is arranged such that the main surface of the electronic component including the temperature sensor 160 is orthogonal to the above-described first surface. Hence, if the "first surface" is defined by the surface along the predetermined direction A, the temperature sensor 160 is preferably arranged such that the main surface of the electronic component including the temperature sensor 160 is orthogonal to the predetermined direction A. In the example shown in FIGS. 3 and 4, the temperature sensor 160 is arranged such that the main surface of the control device 50 including the temperature sensor 160 is orthogonal to the predetermined direction A.

As described above, the more the main surface of the electronic component including the temperature sensor 160 tilts with respect to the direction of the longest vector in the vectors of the airflow generated by inhalation by the user or the direction of the longest vector in the vectors of the secondary airflow generated by the negative pressure generated by inhalation by the user, the more the component of the airflow flowing along the main surface of the electronic component including the temperature sensor 160 decreases. Hence, the cooling effect of the airflow for the temperature sensor 160 is suppressed. This allows the temperature sensor 160 to more accurately acquire the temperature of the power supply 10.

A detailed example of more preferable arrangements of the control device 50 and the temperature sensor 160 will be described below with reference to FIGS. 3 and 4. In the aspect shown in FIGS. 3 and 4, the temperature sensor 160 is incorporated in the control device 50.

The power supply 110 may include a first member 300 that at least partially envelops the temperature sensor 160 and the control device 50, and a second member arranged between the temperature sensor 160 and the control device 50, and the power source 10 or near it. In this embodiment, the second member is formed by the pressure sensor 20 and/or a base member 310. The second member 20 or 310 preferably faces the power supply 10.

The first member 300 may be, for example, a tubular member. When the temperature sensor 160 is at least partially enveloped by the first member 300, the temperature sensor 160 is hardly affected by the airflow and the ambient temperature, and the temperature of the power source 10 can more accurately be detected or estimated. More preferably, the temperature sensor 160 is surrounded by the first member 300 and the second member 20 or 310.

In the form shown in FIGS. 3 and 4, the base member 310 surrounds the pressure sensor 20 and is arranged on the side the power source 10 with respect to the control device 50. The base member 310 is arranged between the temperature sensor 160 and the control device 50, and the power supply 10.

The flavor generation device 100 may include a heat transfer suppression portion that suppresses a heat amount transferred between the temperature sensor 160 and the control device 50, and the case 113. The heat transfer suppression portion may be formed by, for example, the first member 300. In this case, the heat transfer suppression portion, that is, the first member 300 preferably forms a space that houses the temperature sensor 160 and the control device 50. The heat transfer suppression portion may be formed by, for example, a tube made of SUS, or may be formed by a member having a heat conductivity lower than that of SUS. The heat conductivity of the heat transfer suppression portion may be, for example, 24 (W/m.° C.) or less. Since the heat transfer suppression portion is provided between the temperature sensor 160 and the control device 50, and the case 113, heat is hardly transferred to the case 113, and it is possible to prevent the case 113 from becoming too hot. Also, since the ambient temperature is hardly transferred to the temperature sensor 160 via the case 113, the temperature sensor 160 can more accurately detect or estimate the temperature of the power supply 10.

In this embodiment, the cap 330 and the base member 310 are fitted on the first member 300, thereby forming a housing space to house the control device 50 and the temperature sensor 160. The housing space may be open to atmosphere via the above-described opening 114.

In addition, to reduce the contact area between the case 113 and the first member 300 serving as the heat transfer suppression portion, unevenness may be formed on the surface of the first member 300 and/or the case 113, or the surface may be roughened. Even in this case, it is possible to make it difficult to transfer heat to the case 113, and simultaneously make it difficult to transfer the ambient temperature to the temperature sensor 160 via the case 113. A space (air layer) formed between the first member 300 and the case 113 also functions as a heat transfer suppression portion. That is, since the air between the first member 300 and the case 113 has a heat insulating effect, it is possible to make it more difficult to transfer heat to the case 113, and simultaneously make it more difficult to transfer the ambient temperature to the temperature sensor 160 via the case 113.

The flavor generation device 100 may include a heat conduction member arranged between the temperature sensor 160 and the control device 50 and the power source 10 (second electronic component), or near it. The heat conduction member promotes conduction of heat between the power supply 10, and the temperature sensor 160 and the control device 50. Hence, the temperature sensor 160 can more accurately acquire the temperature of the power supply 10.

The heat conduction member may be formed by the pressure sensor 20 and/or the base member 310. In this case, heat generated in the power source 10 can be conducted to the temperature sensor 160 via the pressure sensor 20 and/or the base member 310. In this case, the heat conductivity of the second member, that is, the pressure sensor 20 and/or the base member 310 is preferably higher than the heat conductivity of the first member 300. In this case, the base member 310 may be formed by, for example, a metal member such as crystalline silicon. Thus, the heat generated in the power source 10 is readily conducted to the side of the temperature sensor 160 in the first member 300. Hence, the temperature sensor 160 can more accurately acquire the temperature of the power supply 10.

In place of the above-described aspect, the above-described heat conduction member may be formed by the first member 300. In this case, the first member 300 may be formed by, for example, a tube made of SUS, or may be formed by a member having a heat conductivity higher than that of SUS. In this case, heat generated in the power source 10 can be conducted to the temperature sensor 160 via the first member 300. Hence, the heat conductivity of the base member 310 may be relatively low, and the base member 310 may be formed by, for example, a resin material such as a silicone resin. When the silicone resin is used for the base member 310 in place of crystalline silicon, the electronic component in the power supply 110 can easily be fixed.

In any case, since the heat generated in the power source 10 is readily transferred to the temperature sensor 160 via the heat conduction member, the temperature sensor 160 can accurately acquire the temperature of the power supply 10.

The heat conduction member arranged between the temperature sensor 160 and the control device 50, and the power source 10 (second electronic component), or near it is preferably configured to be hardly affected by heat generated by a heat source, for example, the load 121R different from the power supply 10. In a detailed example, the heat conduction member may be apart from the load 121R. Furthermore, the distance between the heat conduction member and the power source 10 is preferably shorter than the distance between the heat conduction member and the load 121R.

The power supply 110 may include, inside the flavor generation device 10, a housing structure that houses the temperature sensor 160. The housing structure may house not only the temperature sensor 160 but also at least a part of the control device 50. The housing structure may be, for example, a member like a tubular body, or may be a member like a sealing resin. In this embodiment, since the temperature sensor 160 is sealed by a sealing resin, the temperature sensor 160 is more hardly affected by the airflow. Hence, the temperature sensor 160 can more accurately detect or estimate the temperature of the power supply 10.

At least a part of the outer shape of the control device 50 may have a columnar shape. In addition, at least a part of the outer shape of the pressure sensor 20 may have a columnar shape. In this case, the first member 300 preferably has a cylindrical shape. Since at least a part of the outer shape of the control device 50 and/or the pressure sensor 20 has a columnar shape, the entire flavor generation device 10 can easily be formed into a pillar shape, more preferably, a columnar shape. This can manufacture the flavor generation device 10 into a shape similar to a conventional cigarette shape.

As described above, since the temperature sensor 160 is provided far from the power supply 10, the control device 50 may estimate the temperature of the power source 10 from the output value read by the temperature sensor 160. That is, the temperature at the position of the temperature sensor 160 is sometimes slightly different from the temperature of the power supply 10. In this case, the control device 50 may be configured to estimate the temperature of the power source 10 from the output value of the temperature sensor 160 by measuring the deviation between the actual temperature of the power source 10 and the output value of the temperature sensor 160 in advance by experiments.

Figure 8:
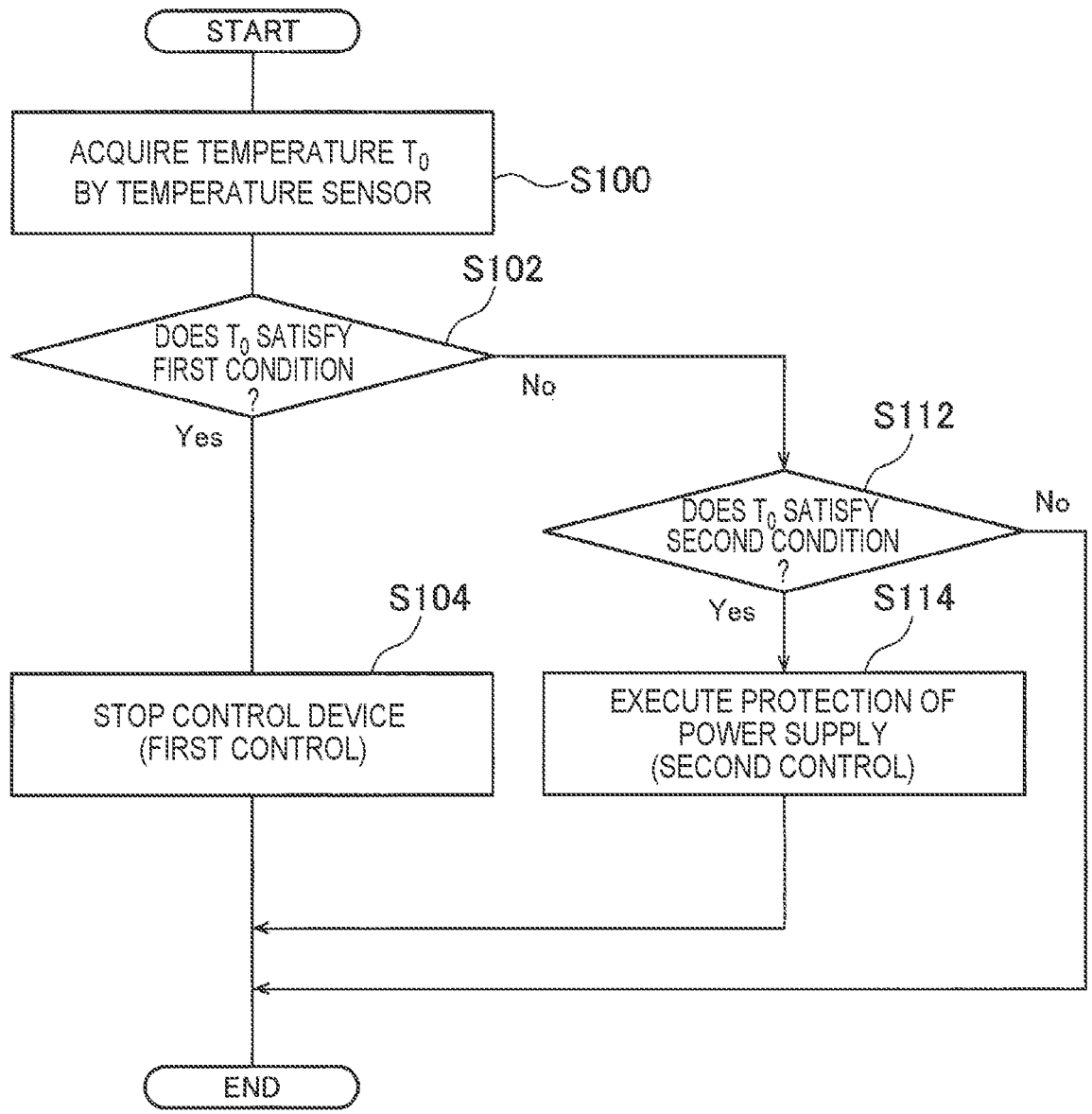
FIG. 8 is a flowchart showing a procedure of control using a temperature acquired by a temperature sensor.

FIG. 8 is a flowchart showing a procedure of control using a temperature acquired by the temperature sensor 160. The flowchart shown in FIG. 8 is preferably executed by the control device 50 during the operation of the flavor generation device 100, more specifically, the control device 50. More preferably, the flowchart shown in FIG. 8 is executed by the control device 50 during at least one of charge and discharge of the power supply 10. During charge in which a high load is applied to the power supply 10, the control device 50 particularly preferably performs control including protection of the power source 10 to be described below. Here, discharge of the power source 10 means supply of power from the power source 10 to the load 121R.

First, the control device 50 acquires an output value (To) of the temperature sensor 160 (step S100).

If the output value (To) of the temperature sensor 160 satisfies a first condition, the control device 50 executes first control concerning the first electronic component (steps S102 and S104).

In the control shown in this flowchart, the first electronic component is the control device 50, and the first condition is a condition that the temperature falls outside the range of the recommended operation temperature of the control device 50. For example, the first condition is "To>85° C., or To<−40° C.". That is, if the output value (To) of the temperature sensor 160 satisfies the first condition, the control device 50 judges that the temperature falls outside the recommended operation temperature of the control device 50 itself. In this case, as the first control, the control device 50 may perform control to inhibit charge or discharge of the power source 10 and stop the operation of the control device 50 itself (step S104). In addition, the control device 50 may notify the user to an abnormality by the notification unit 40 as needed.

If the output value (To) of the temperature sensor 160 satisfies a second condition different from the above-described first condition, the control device 50 executes second control concerning the power source 10 (steps S112 and S114).

In this embodiment, the second condition may be defined by a temperature range different from the range of the recommended operation temperature for the power supply 10. In this case, the second control in step S114 may be protection control of protecting the power supply 10.

For example, if the output value of the temperature sensor 160 is equal to or less than a first predetermined temperature at which the electrolytic liquid or ionic liquid of the power source 10 solidifies, or if the temperature of the power source 10 is estimated, based on the output value of the temperature sensor 160, to be equal to or less than the first predetermined temperature, the control device 50 executes protection control of protecting the power source 10 as the second control. The protection control may include at least one or preferably both of suppression or inhibition of at least one of charge and discharge of the power source 10 and transmission of a warning signal.

Transmission of the warning signal as protection control is performed by the control device 50 of the notification unit 40. That is, the control device 50 can notify the user of the abnormality of the power supply by the notification unit 40.

Suppression or inhibition of at least one of charge and discharge of the power source 10 can be executed when the control device 50 temporarily or always sets the switch 140 or the switch 180 in an OFF state. Hence, the power source 10 can be protected within such a temperature range that the electrolytic liquid or ionic liquid of the power source 10 solidifies. The first predetermined temperature is, for example, 0° C. When the temperature of the power source 10 is lower than 0° C., water in the power supply 10, for example, water in the electrolytic liquid can solidify, and degradation of the power source 10 readily promoted. Hence, use of the power source 10 is preferably suppressed or inhibited within the temperature range.

As a detailed example in steps S112 and S114, the control device 50 may be configured to execute protection control of protecting the power source 10 if the output value of the temperature sensor 160 is equal to or less than a second predetermined temperature at which electrodeposition occurs in the electrode of the power supply 10, or if the temperature of the power source 10 is estimated, based on the output value of the temperature sensor 160, to be equal to or less than the second predetermined temperature. The protection control is the same as described above.

In particular, in a case in which the power source 10 is a lithium ion secondary battery, if a high load is applied to the power source 10 at a low temperature, deposition (electrodeposition) of metal lithium may occur on the surface of the negative electrode. Hence, the protection operation as described above is preferably executed. Here, the second predetermined temperature can change depending on the type of the lithium ion secondary battery and is therefore preferably specified in advance by experiments.

Also, as a detailed example in steps S112 and S114, the control device 50 may be configured to execute protection control of protecting the power source 10 if the output value of the temperature sensor 160 is equal to or more than a third predetermined temperature at which the structure or composition of the electrode of the power source 10 changes, or if the temperature of the power source 10 is estimated, based on the output value of the temperature sensor 160, to be equal to or more than the third predetermined temperature. The protection control is the same as described above. If the temperature of the power source 10 is excessively high, the structure or composition of the electrode may change. Hence, the control device 50 preferably executes the protection control as described above. The third predetermined temperature may be, for example, 60° C.

From the viewpoint of protection of the power source 10 as described above, particularly, protection of the lithium ion secondary battery, the control device 50 may be configured to execute protection control of protecting the power source 10 if the output value of the temperature sensor 160 is less than 0° C. or equal to or more than 60° C., or if the temperature of the power source 10 is estimated, based on the output value of the temperature sensor 160, to be less than 0° C. or equal to or more than 60° C. (steps S112 and S114). The protection control is the same as described above.

As shown in the flowchart of FIG. 8, if the output value of the temperature sensor 160 satisfies a predetermined condition (second condition), the control device 50 is configured to execute predetermined control (protection control) concerning the power source 10 (second electronic component) without executing predetermined control (the above-described first control) concerning the control device 50 (first electronic component). As a detailed example, if the output value of the temperature sensor 160 belongs to a range in which cooling of the control device 50 is unnecessary, and also satisfies a predetermined condition, the control device 50 executes protection control of the power supply 10. The control device 50 can thus execute both control operations of protection of the control device 50 and protection of the power source 10 by the single temperature sensor 160.

The flowchart shown in FIG. 8 is preferably repetitively executed, for example, during charge or discharge of the power supply 10. After the protection control (step S114) of the power source 10 is executed, if the output value of the temperature sensor 160 returns to a normal range, protection control of the power source 10 may be canceled. That is, in this case, the control device 50 enables charge or discharge of the power supply 10.

Figure 9:
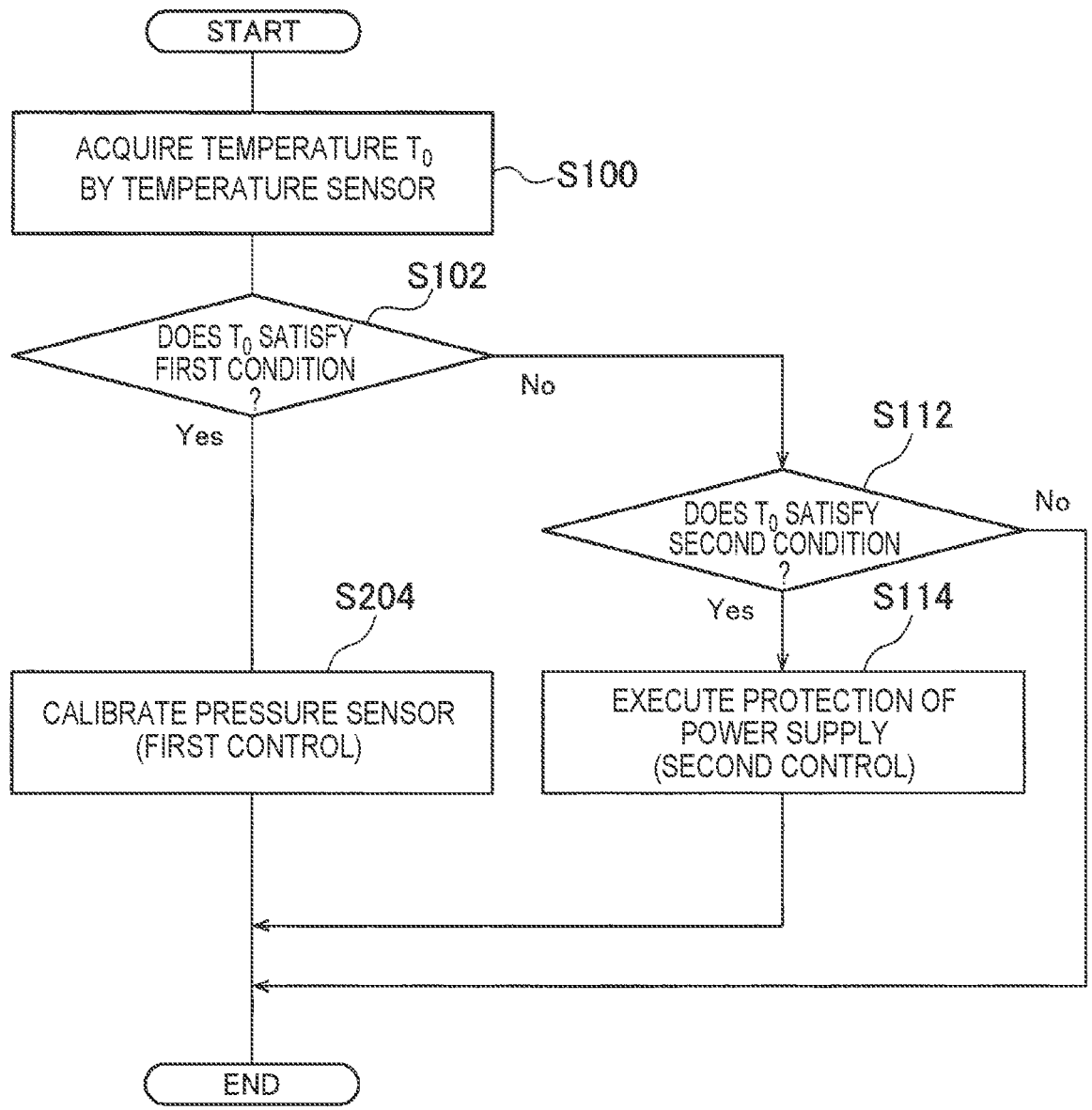
FIG. 9 is a flowchart showing another procedure of control using a temperature acquired by the temperature sensor.

FIG. 9 is a flowchart showing another procedure of control using a temperature acquired by the temperature sensor 160. Referring to FIG. 9, first, the control device 50 acquires the output value (To) of the temperature sensor 160 (step S100).

If the output value (To) of the temperature sensor 160 satisfies the first condition, the control device 50 executes first control concerning the first electronic component (steps S102 and S204). In the control shown in this flowchart, the first electronic component is the pressure sensor 20, and the first condition is a condition that the output value of the pressure sensor 20 changes. If the output value (To) of the temperature sensor 160 satisfies the first condition, the control device 50 or the pressure sensor 20 calibrates, based on the output value of the temperature sensor 160, a pressure value acquired by the pressure sensor 20 (step S204). The temperature and the pressure of a gas have correlation by a state equation. Hence, when the pressure sensor 20 is calibrated in accordance with a temperature change, even if the temperature changes, the relationship between the inhalation force of the user and the output value of the pressure sensor 20 can be made even.

If the output value (To) of the temperature sensor 160 satisfies a second condition different from the above-described first condition, the control device 50 executes second control concerning the power source 10 (steps S112 and S114).

In this embodiment, the second condition may be defined by a temperature range different from the range of the recommended operation temperature for the power supply 10. In this case, the second control in step S114 may be protection control of protecting the power supply 10. If the output value of the temperature sensor 160 falls within a temperature range different from the range of the recommended operation temperature for the power supply 10, calibration of the pressure sensor 20 is unnecessary. Note that the procedure (steps S112 and S114) concerning protection control of protecting the power source 10 is the same as the procedure shown in FIG. 8, and a description thereof will be omitted.

If the pressure sensor 20 is calibrated, the control device 50 can detect the inhalation operation of the user using the calibrated pressure sensor 20. Upon detecting the inhalation operation of the user, the control device 50 turns on the switch 140 to supply power to the load 121R.

In the above-described procedures shown in FIGS. 8 and 9, if the output value of the temperature sensor 160 is too large or too small, the control device 50 is turned off, or protection control of the power source 10 is performed. Instead, the control device 50 may perform temperature control using a temperature control mechanism (not shown) such that the temperature of an electronic component such as the power source 10 falls within an appropriate range. For example, if the output value of the temperature sensor 160 is too large, the temperature control mechanism cools the control device 50 or the power supply 10. If the output value of the temperature sensor 160 is too small, the temperature control mechanism heats the control device 50 or the power supply 10.

(Program and Storage Medium)

The above-described procedures shown in FIGS. 8 and 9 can be executed by the control device 50. That is, the control device 50 may have a program that causes the power supply 110 to execute the above-described method and a storage medium that stores the program.

Other Embodiments

The present invention has been described by the above-described embodiment. However, it should not be understood that the description and drawings constituting a part of this disclosure limit the present invention. From this disclosure, various alternative embodiments, examples, and operation techniques will be apparent to those skilled in the art.

For example, in the above-described embodiment, the flavor generation device 100 includes both the aerosol source that generates an aerosol and the flavor source containing a tobacco raw material that generates a tobacco flavor component or an extract derived from a tobacco raw material. Instead, the flavor generation device 100 may include only one of the aerosol source and the flavor source.

Note that in this specification, the term "flavor" may be defined as a broad concept including a tobacco flavor component generated from a flavor source or an aerosol source or a tobacco flavor component derived from a flavor source or an aerosol source.

Also, in the above-described embodiment, the electrical load 121R is configured to act on the aerosol source and vaporize or atomize the aerosol source. Instead, the electrical load 121R may be configured to heat the flavor source or flavor unit and emit a flavor. Also, the electrical load 121R may be configured to heat both the aerosol source and the flavor source.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A flavor generation device comprising:
   a power supply;
   an atomizer configured to atomize a flavor source by power supplied from the power supply and having a channel configured to pass an airflow generated by inhalation by a user;
   a control device configured to control power to be supplied to the atomizer from the power supply; and
   a temperature sensor configured to output one of a detection value and an estimation value of a temperature of the power supply to the control device,
   wherein the power supply is between the temperature sensor and the atomizer.

2. The flavor generation device according to claim 1, further comprising:
   an inlet configured to take outside air into the channel; and
   a mouthpiece used to inhale a flavor of the atomized flavor source from the atomizer.

3. The flavor generation device according to claim 1, further comprising a cap over the temperature sensor,
   wherein an opening in the cap exposes the temperature sensor to atmosphere.

4. The flavor generation device according to claim 1, further comprising a mouthpiece used to inhale a flavor of the atomized flavor source from the atomizer.

5. The flavor generation device according to claim 1, wherein a housing structure configured to envelop the temperature sensor is included inside the flavor generation device.

6. The flavor generation device according to claim 1, further comprising a case, and a first member arranged within the case and configured to at least partially envelop the temperature sensor.

7. The flavor generation device according to claim 6, further comprising a pressure sensor arranged between the temperature sensor and the power supply.

8. The flavor generation device according to claim 1, further comprising at least one of an electrolytic liquid and an ionic liquid in the power supply,
   wherein the control device is configured to execute protection control of protecting the power supply if an output value of the temperature sensor is not more than a first predetermined temperature at which the electrolytic liquid or the ionic liquid solidifies, or if the temperature of the power supply is estimated, based on the output value of the temperature sensor, to be not more than the first predetermined temperature.

9. The flavor generation device according to claim 8, wherein the protection control includes at least one of suppression of at least one of charge and discharge of the power supply and transmission of a warning signal.

10. The flavor generation device according to claim 1,
    wherein the power supply is a lithium ion secondary battery, and
    wherein the control device is configured to execute protection control of protecting the power supply if the output value of the temperature sensor is not more than a first predetermined temperature at which electrodeposition occurs in an electrode of the power supply, or if the temperature of the power supply is estimated, based on the output value of the temperature sensor, to be not more than the first predetermined temperature.

11. The flavor generation device according to claim 1, wherein the control device is configured to execute protection control of protecting the power supply if the output value of the temperature sensor is not less than a first predetermined temperature at which a structure or a composition of an electrode of the power supply changes, or if the temperature of the power supply is estimated, based on the output value of the temperature sensor, to be not less than the first predetermined temperature.

12. The flavor generation device according to claim 1, wherein the control device is configured to execute protection control of protecting the power supply if the output value of the temperature sensor is less than 0° C. or not less than 60° C., or if the temperature of the power supply is estimated, based on the output value of the temperature sensor, to be less than 0° C. or not less than 60° C.

* * * * *